US008654459B2

United States Patent
Hori (10) Patent No.: US 8,654,459 B2
(45) Date of Patent: Feb. 18, 2014

(54) RESIN MOLDED LENS

(71) Applicant: Yazaki Corporation, Tokyo (JP)

(72) Inventor: Takahiro Hori, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/892,056

(22) Filed: May 10, 2013

(65) Prior Publication Data

US 2013/0250433 A1 Sep. 26, 2013

Related U.S. Application Data

(63) Continuation of application No. PCT/JP2011/080600, filed on Dec. 28, 2011.

(30) Foreign Application Priority Data

Jan. 5, 2011 (JP) .................. 2011-000693

(51) Int. Cl.
G02B 7/02 (2006.01)
(52) U.S. Cl.
USPC .......................................................... 359/811
(58) Field of Classification Search
USPC .................. 359/811, 819; 264/1.32
See application file for complete search history.

(56) References Cited

U.S. PATENT DOCUMENTS

2005/0258764 A1* 11/2005 Nagai et al. ..................... 315/77

FOREIGN PATENT DOCUMENTS

| DE | 19823500 A1 | 12/1998 |
| JP | 2009-126041 A | 6/2009 |
| WO | 03/031144 A1 | 4/2003 |

OTHER PUBLICATIONS

International Search Report and Written Opinion of the International Search Report for PCT/JP2011/080600 dated May 7, 2012.
Christoffers K-E: "Praezisionskunststoffteile Gestaltung, Werkzeugauslegung Und Verarbeitungsbedingungen", Feinwerktechnik + Messtechnik, Hanser, Munchen, DE, vol. 87, No. 6, Sep. 1, 1979, pp. 259-270, XP001173854, ISSN: 0340-1952 figure 8.

* cited by examiner

*Primary Examiner* — Joseph P Martinez
(74) *Attorney, Agent, or Firm* — Kenealy Vaidya LLP (57) ABSTRACT

In a resin molded lens 20 of an interior illumination lamp which includes inserting openings inserting seesaw type switch knobs, gates G and G1 for a resin molding are formed so as to be installed at inner side surfaces of the inserting openings when the resin molding is performed by molds D1 and D2, and protrusions 20T having heights higher than heights of gate traces G2 generated by the gates G and G1 are formed in the vicinity of gate traces G2.

2 Claims, 13 Drawing Sheets

Fig.13

RESIN MOLDED LENS

CROSS REFERENCE TO RELATED APPLICATION

This application is a continuation of PCT application No. PCT/JP2011/080600, which was filed on Dec. 28, 2011 based on Japanese Patent Application (No. 2011-000693) filed on Jan. 5, 2011, the contents of which are incorporated herein by reference. Also, all the references cited herein are incorporated as a whole.

BACKGROUND OF THE INVENTION

1. Field of the Invention

The present invention relates to a resin molded lens, and more particularly, a resin molded lens which does not scratch a switch knob of a seesaw switch which is embedded in a lens of a vehicle interior illumination lamp.

2. Description of the Related Art

A lens of an interior illumination lamp which is installed on a ceiling of a vehicle is a resin molded product, and there is a problem in that a gate remainder occurs when the lens is molded. As a technology for solving the problem, the invention described in JP-A-2009-126041 is known.

The prior art described in JP-A-2009-126041 is to prevent occurrence of weld lines when a resin molded product is formed, in which a resin-made gear which has a center hole with both ends opened in the center portion thereof and a gate disposed in the hole of the center hole, and a shaft body which is pressed into the center hole are provided. In addition, a runner remainder is cut and removed at a portion of a gate remainder by inserting the shaft body into the center hole, and the position of the gate is provided at a place which is positioned at a predetermined height above a rear surface of a disc-shaped body in the center hole.

According to the seesaw switch described in JP-A-2009-126041, it is possible to prevent the gate remainder from being generated when the resin molded product is formed. However, it is difficult to completely prevent the gate remainder, and there is a problem in that scratches occur on the counterpart to be fitted.

SUMMARY OF THE INVENTION

The present invention has been made in view of these situations. It is an object of the present invention is to provide a switch knob which does not scratch a counterpart to be fitted even though a gate remainder occurs since it is difficult to completely prevent the gate remainder from being generated.

According to a first aspect of the present invention, there is provided a resin molded lens of an interior illumination lamp, the resin molded lens including an inserting opening inserting a seesaw type switch knob, wherein the resin molded lens is formed by installing a gate for resin molding at an inner side surface of the inserting opening when the resin molding is performed.

According to a second aspect of the present invention, in the first aspect of the present invention, a protrusion having a height higher than a height of a gate trace generated by the gate is formed in the vicinity of the gate trace.

As described above, according to the first aspect of the present invention, since it is difficult to see the gate trace from the surface of the lens, a lens having an improved appearance can be obtained.

According to the second aspect of the present invention, since the protrusion having bulk higher than the height of the gate trace is formed in the vicinity of the gate trace, scratches in the switch knob do not occur even though the gate trace is generated.

BRIEF DESCRIPTION OF DRAWINGS

FIGS. 1 (A) and (B) are perspective views of an interior illumination lamp assembly for a vehicle which is an object of the present invention.

FIG. 3(A) shows the state before the contact is pressed into the switch knob, and FIG. 3(B) shows the state after the contact is pressed into the switch knob.

DESCRIPTION OF THE PREFERRED EMBODIMENTS

Hereinafter, a switch knob which does not scratch a counterpart to be fitted even though a gate remainder occurs will be described.

<Interior Illumination Lamp Assembly for Vehicle which is an Object of the Invention>

Figure 1A:
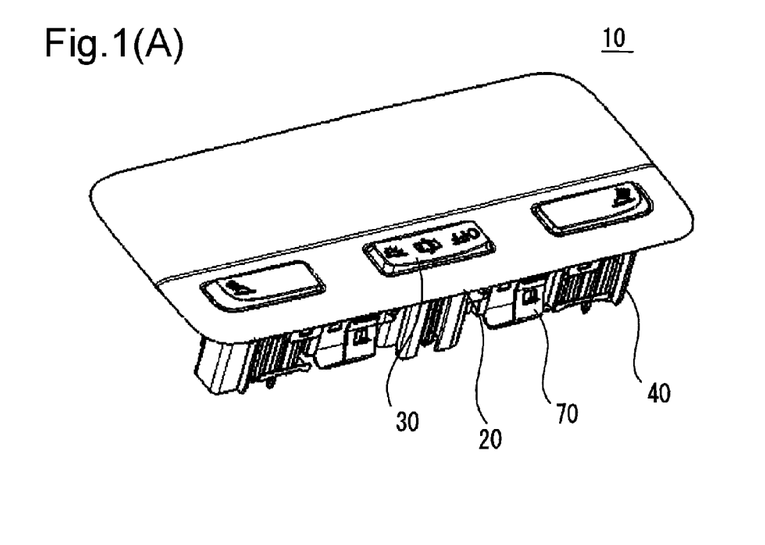
FIG. 1(A) is a perspective view when viewing from the front side.

First, an interior illumination lamp assembly for a vehicle, in which a switch knob which is an object of the present invention is used, will be described. FIGS. 1 (A) and (B) are perspective views of the interior illumination lamp assembly for a vehicle, FIG. 1(A) is a perspective view when viewing from the front side, and FIG. 1(B) is a perspective view when viewing from the rear side.

The interior illumination lamp assembly 10 for a vehicle is constituted by engaging and integrating a lens 20 (FIG. 2) and a housing 40 (FIG. 2) through locking holes 20K of the lens 20 and locking protrusions 40K of the housing 40.

<Configuration of Interior Illumination Lamp for Vehicle>

Figure 1B:
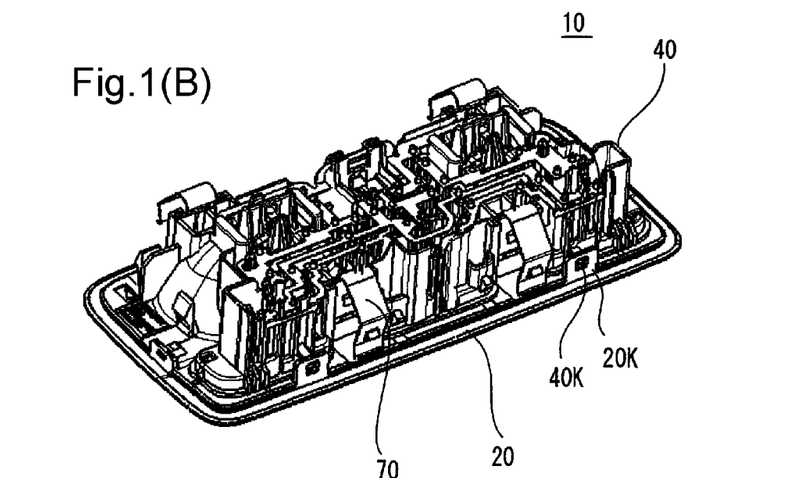
FIG. 1(B) is a perspective view when viewing from the rear side.
Figure 2:
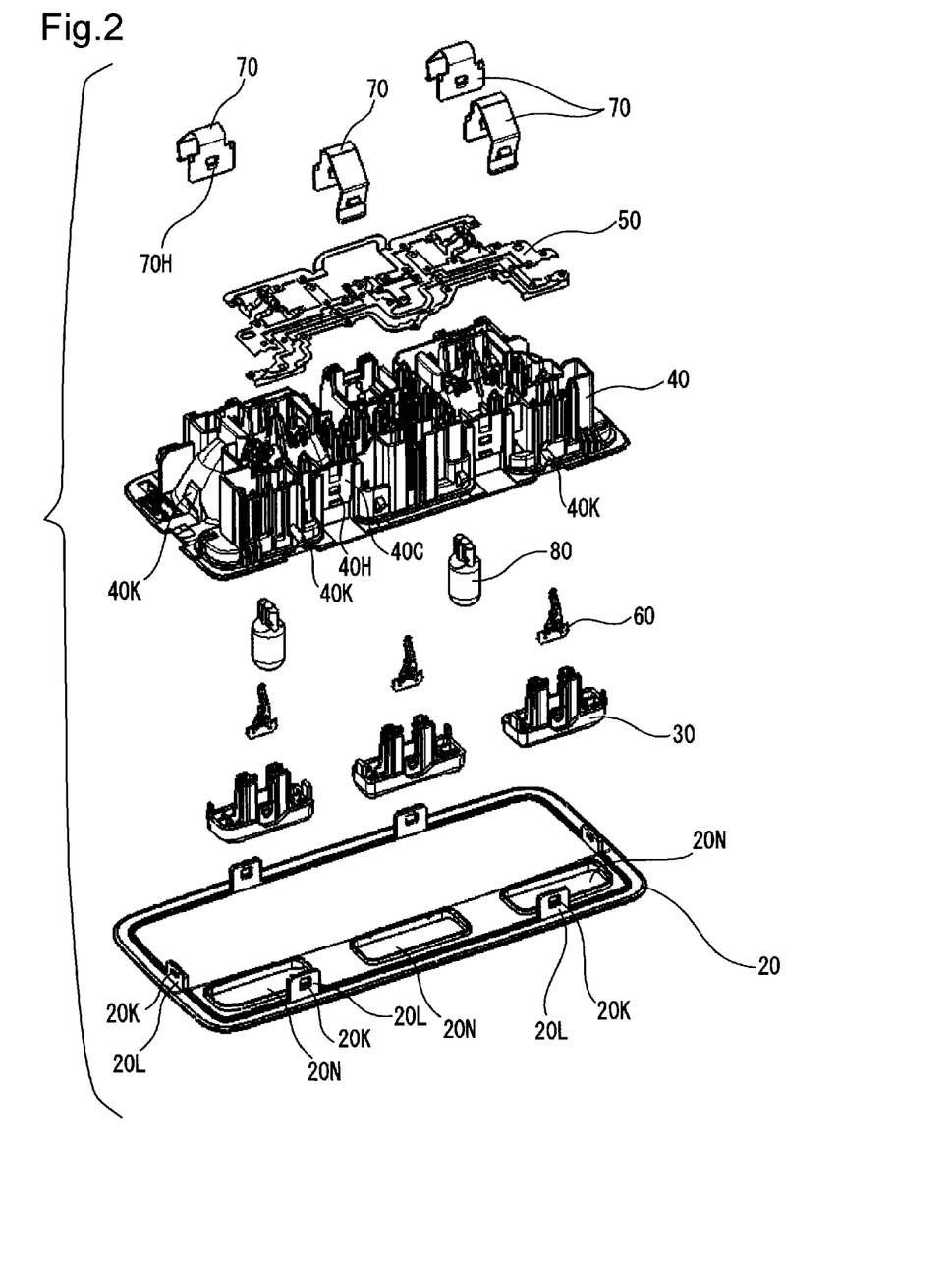
FIG. 2 is an exploded perspective view of the interior illumination lamp assembly for a vehicle of the state of FIG. 1(B).

FIG. 2 is an exploded perspective view of the interior illumination lamp assembly for a vehicle of the state of FIG. 1(B).

In FIG. 2, the interior illumination lamp assembly 10 for a vehicle is constituted by metal clips 70, a bus bar 50, a housing 40, bulbs 80, contacts 60, switch knobs 30, and a lens 20 in this order from the top.

Here, first, each component will be described below.

<Lens 20>

Figure 6:
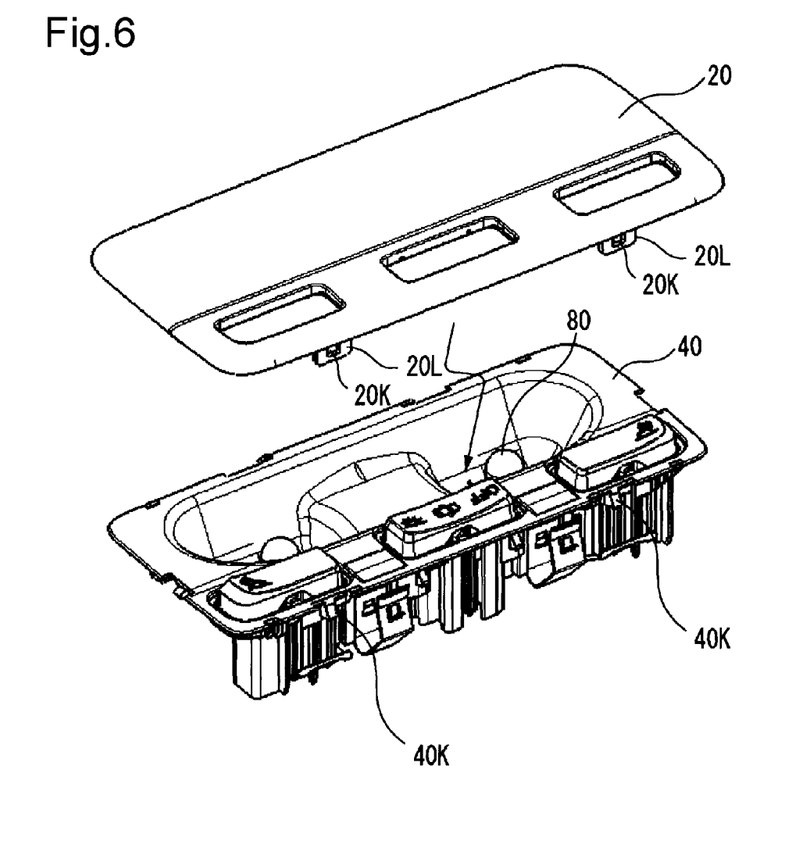
FIG. 6 is a perspective view showing a state before a lens is assembled to the housing.

In FIG. 2, the lens 20 (FIG. 6) is a rectangular resin member which has a lens function which transmits light from the bulbs 80 (FIG. 6). In the lens 20, a plurality of (six over the entire periphery in the present embodiment) locking members 20L including a locking hole 20K are provided over the entire periphery of the peripheral edge of the lens, and insertion openings 20N (three in the present embodiment) to which the switch knobs 30 are inserted are opened in the lens. In FIG. 2, the rear surface of the lens 20 becomes a design surface.

<Housing 40>

In FIG. 2, the housing 40 is a resin member which accommodates the switch knobs 30, the bus bar 50, the contacts 60, the metal clips 70 and bulbs 80 other than the lens 20. The surface of the housing 40 which faces the lens 20 is approximately rectangular, and a plurality of (six over the entire periphery in the present embodiment) locking protrusions 40K which protrude outward from the vertical surface at the peripheral edge of the rectangle are provided over the entire periphery of the housing.

<Switch Knob 30>

In FIG. 2, the switch knobs 30 are a seesaw switch which is constituted by pressing the contacts 60 into the knobs. A tip of the contact 60 contacts the counterpart terminal by seesaw movement, when one of the pressed portions is pressed, and the tip of the contact 60 is separated from the counterpart terminal and connected to the other terminal when the other one of the pressed portions is pressed. FIG. 3 is a perspective view showing states before and after the contact 60 is pressed into the switch knob 30, FIG. 3(A) shows the state before the contact 60 is pressed into the switch knob 30, and FIG. 3 (B) shows the state after the contact 60 is pressed into the switch knob 30.

Figure 3A:
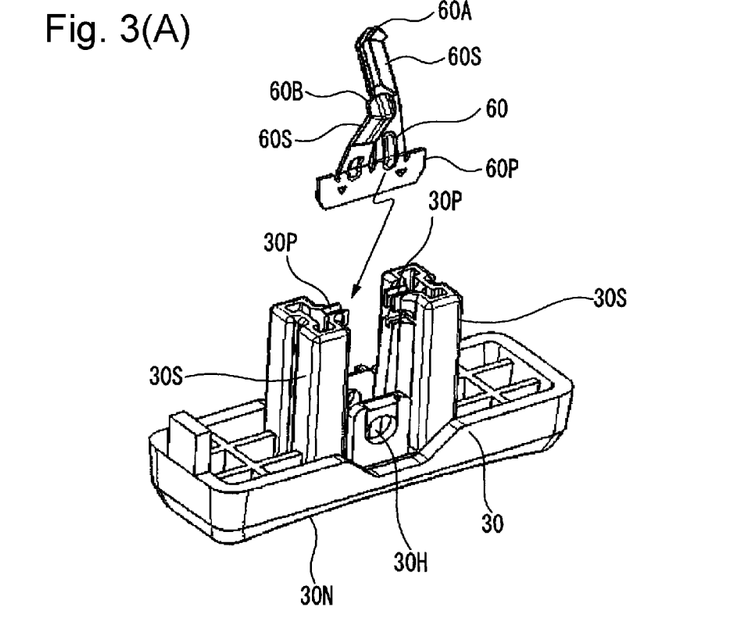
FIGS. 3(A) and 3(B) are perspective views showing states before and after a contact is pressed into a switch knob.
Figure 3B:
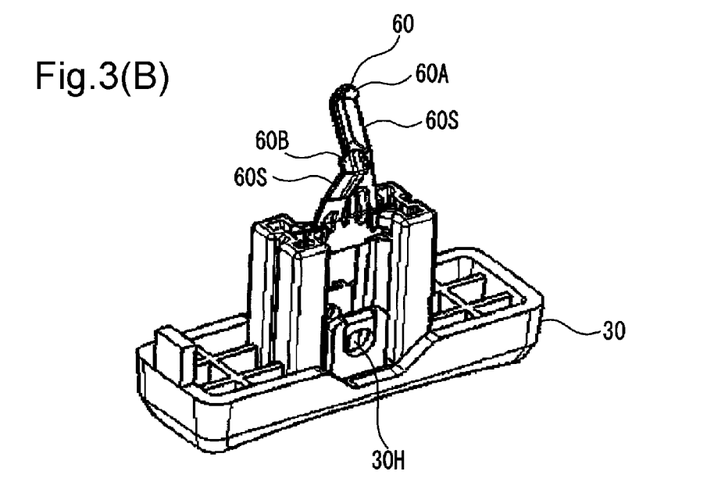

In FIG. 3(A), a pressed portion 30N which has a flat and elongate cover-shape, two receiving portions 30S which are erected in a columnar form from the pressed portion 30N with a distance upward in a vertical direction in the drawing, a shaft hole 30H which is provided at the center between the two receiving portions 30S and becomes a center of the seesaw movement, and press fitting grooves 30P which are provided at facing surfaces of two columnar receiving portions 30S and into which a press fitting portion 60P of the contact 60 is pressed are formed and constitute the switch knob 30.

In this way, if the press fitting portion 60P of the contact 60 is pressed into the press fitting grooves 30P of the two columnar receiving portions 30S of the switch knob 30 from above in the drawing, as shown in FIG. 3(B), the press fitting portion 60P of the contact 60 is received into the switch knob 30, and two legs 60S which extend in the reverse direction to each other from the press fitting portion 60P of the contact 60 protrude from the switch knob 30.

Therefore, if the switch knob 30 performs the seesaw movement about the shaft hole 30H of the switch knob 30, the two legs 60S protruding from the switch knob 30 rotate about the shaft hole 30H.

<Bus Bar 50>

Figure 4A:
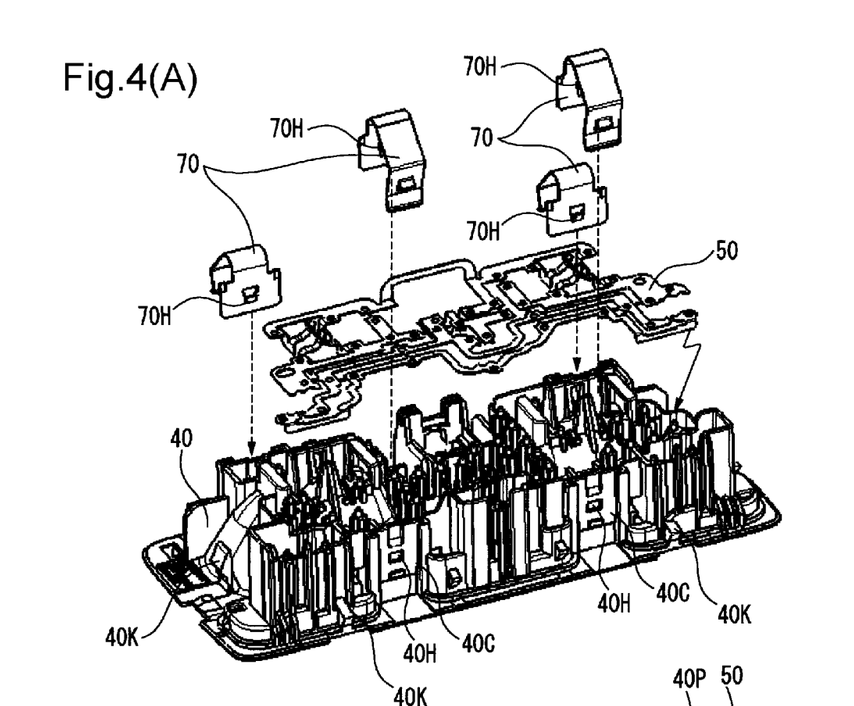
FIG. 4(A) is a perspective view showing a state before a bus bar and metal clips are assembled to a housing.

In FIG. 2, the bus bar 50 is a long metal plate for connecting between portions to be electrically connected among the switch knobs 30, the contacts 60, and the bulbs 80 which are mounted on the housing 40, and the bus bar 50 is constituted of a plural in the number. The bus bar constitutes a lamp functioning portion by being fitted to the housing 40 from above in FIG. 4.

<Contact 60>

In FIG. 2, as seen from the enlarged view of FIG. 3(A), in the contact 60, the press fitting portion 60P which is pressed between two receiving portions 30S of the switch knob 30, legs 60S and 60S which extend obliquely upward in a reverse direction to each other respectively at the same side from two points separated by the same distance from the center of the press fitting portion 60P, and contacting portions (contact points) 60A and 60B which are the end of each of the legs 60S and 60S are integrally formed.

<Metal Clip 70>

Figure 4B:
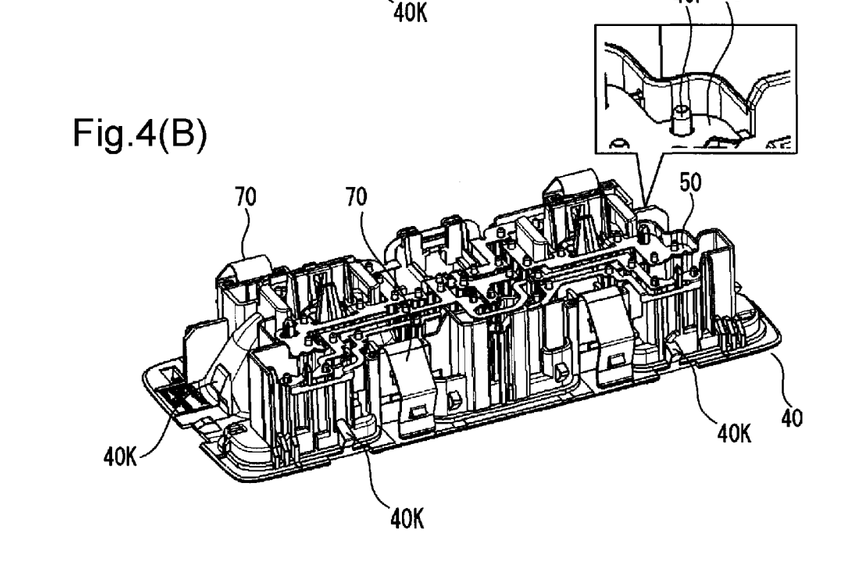
FIG. 4(B) is a perspective view showing the state after the bus bar and the metal clips are assembled to the housing.

In FIG. 2, the metal clips 70 are formed by curving an elastic metal plate in a U-shape, and a locking piece 70H is formed at one leg of the U-shape. On the other hand, since locking holes 40H are formed on the clip locking portions 40C of the outer periphery side of the housing 40, by engaging the locking pieces 70H (FIG. 4(A)) of the metal clips 70 to the locking holes 40H of the clip locking portions 40C of the housing 40, the metal clips 70 are assembled to the housing 40 as shown in FIG. 4(B).

<Bulb 80>

In FIG. 2, the bulbs 80 are the light source and perform being lighted and extinguished according to signals from the vehicle. The bulbs 80 are received on bottom portions of bulb receiving portions 40L (FIG. 5(B)) which are indented on the housing 40 and have a bowl-shape, and light emitted from the bulbs 80 is directed to the lens 20 side as shown in FIG. 6.

<Preparation Procedure of Interior Illumination Lamp Assembly for Vehicle>

Next, preparation procedures of the interior illumination lamp assembly for a vehicle using the above-described parts will be described.

Procedure 1) Contacts 60 are pressed into switch knobs 30:

In FIG. 3, first, the press fitting portion 60P of the contact 60 is pressed into the pressing fitting grooves 30P of the two columnar receiving portions 30S of the switch knob 30 from above in the drawing, and the contact 60 is mounted on the switch knob 30 as shown in FIG. 3(B).

Procedure 2) Bus bar 50 and metal clips 70 are assembled into housing 40:

Next, the bus bar 50 of FIG. 4(A) is mounted on a predetermined position of the housing 40. Pin inserting holes may be provided in predetermined places of the bus bar 50, and pins 40P are erected at the housing 40. If the bus bar 50 is mounted on a predetermined position of the housing 40, the pins 40P of the housing 40 are inserted into the pin inserting holes of the bus bar 50. This is shown in the extracted portion of FIG. 4(B). After the pins 40P of the housing 40 are inserted into the pin inserting holes of the bus bar 50, the bus bar 50 is fixed to the housing 40 by heat-welding the pins 40P.

In addition, the metal clips 70 are assembled to the housing 40 as shown in FIG. 4(B) by engaging the locking pieces 70H (FIG. 4(A)) of the metal clips 70 to the locking holes 40H of the clip locking portions 40C of the housing 40.

Figure 5A:
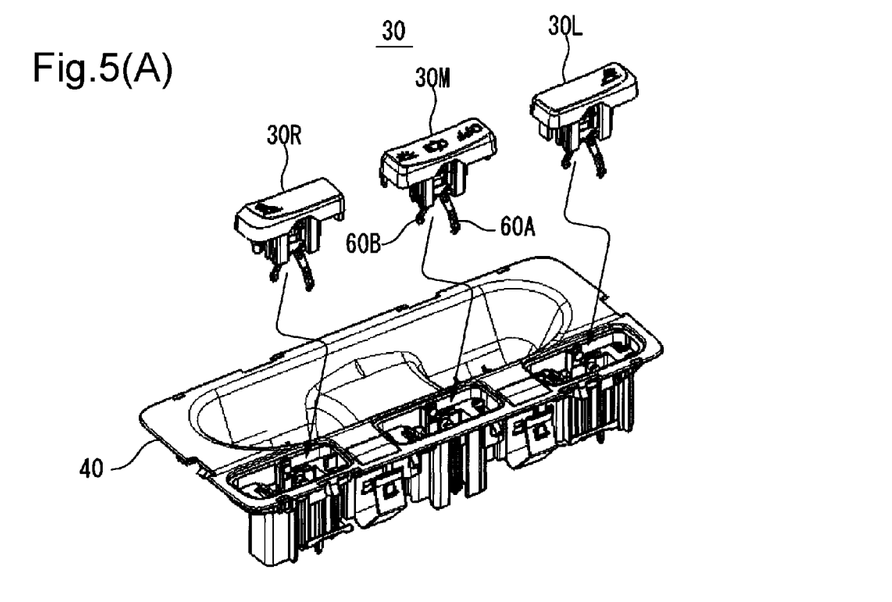
FIG. 5(A) is a perspective view showing a state before the switch knobs are assembled to the housing.
Figure 5B:
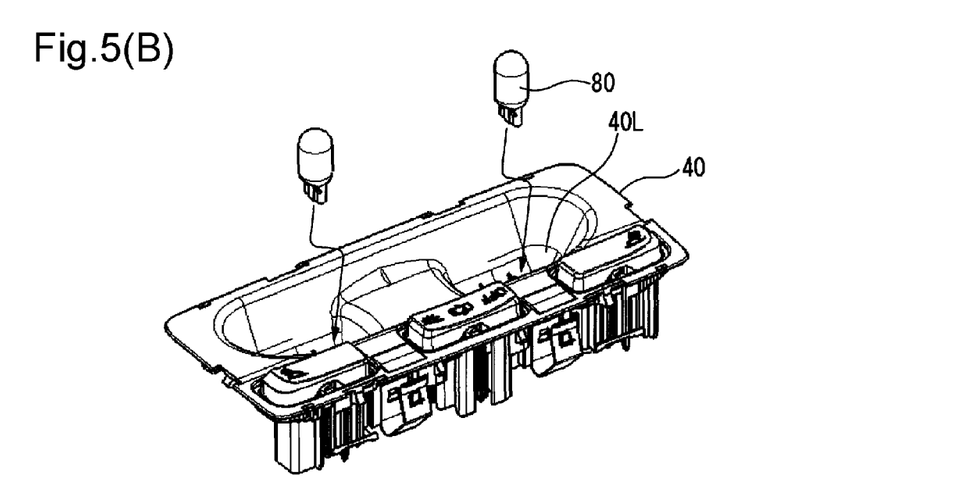
FIG. 5(B) is a perspective view showing a state before bulbs are assembled after the switch knobs are assembled.

Procedure 3) Switch knobs 30 are assembled to housing 40:

Next, the switch knobs 30 (FIG. 5(A)) obtained as a result of procedure 1 are assembled to the housing 40 (FIG. 5(A)) obtained as a result of procedure 2, and the assembly of the contacts 60 and the bulbs 80 are assembled (refer to FIG. 5(B)).

Procedure 4) Lens 20 is assembled to housing 40:

Finally, the lens 20 (FIG. 2) is assembled to the housing 40 (FIG. 6) obtained as a result of procedure 3.

In order to assemble the lens 20 to the housing 40, the locking protrusions 40K of the housing 40 may be engaged to the locking holes 20K of the locking members 20L of the lens 20.

In this way, if all parts are mounted, the interior illumination lamp assembly 10 for a vehicle of FIG. 1 is completed.

<Circuit Diagram of Interior Illumination Lamp Assembly 10 for Vehicle of FIG. 1>

Figure 7:
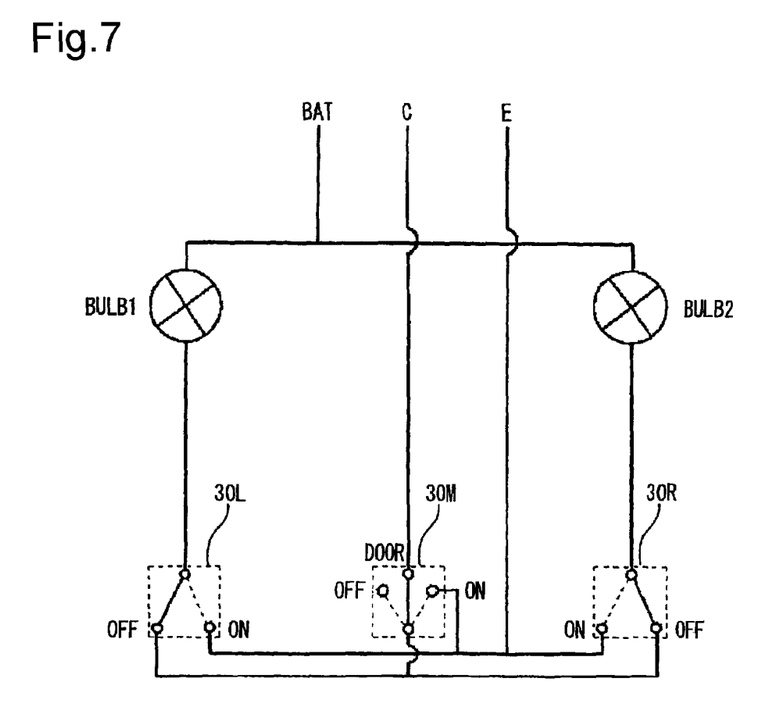
FIG. 7 is a circuit diagram of the interior illumination lamp assembly for a vehicle of FIG. 1.

FIG. 7 shows a circuit diagram of the interior illumination lamp assembly 10 for a vehicle of FIG. 1.

In FIG. 7, since the number of the switch knobs 30 is three, the switch knobs 30 are denoted by 30R (right), 30M (middle), and 30L (left) from the right. The preparation procedure of the interior illumination lamp assembly for a vehicle using the parts will be described. Among these, the switch knob 30R and the switch knob 30L adopt a two-contact point system, and the switch knob 30M adapts a three-contact point system.

1) Operation of Switch Knob 30L:

1-1) The switch knob 30M is a switch in which extinguishing is performed if the door is closed and lighting is performed if the door is opened when the contact point of the switch knob 30M is a DOOR side. However, in order to perform the lighting of the bulb B1 regardless of the opening and the closing of the door even if the switch knob 30M is on the DOOR side, the contact point of the switch knob 30L is set to the ON side.

Thereby, a circuit of the battery→the bulb B1→the ON side→an earth wire is closed and lighting is performed.

1-2) Moreover, in order to perform extinguishing of the lighted bulb B1, the contact point of the switch knob 30L becomes an OFF side. Thereby, a circuit which goes from the battery →the bulb B1→the OFF side to the earth wire is not formed, and the extinguishing is performed.

2) Operation of Switch Knob 30R 2-1) In order to perform the lighting of the bulbs B2 regardless of the opening and the closing of the door even if the switch knob 30M is on the DOOR side, the contact point of the switch knob 30R is set to the ON side.

Thereby, a circuit of the battery→the bulb B2→the ON side→the earth wire is closed and lighting is performed.

2-2) Moreover, in order to perform extinguishing of the lighted bulb B2, the contact point of the switch knob 30R becomes an OFF side. Thereby, a circuit which goes from the battery→the bulb B2→the OFF side to the earth wire is not formed, and the extinguishing is performed.

3) Operation of Switch Knob 30M 3-1) The DOOR side of the switch knob 30M is connected to a courtesy line C, the courtesy line C is connected to a door opening/closing switch which is installed on a portion of a body facing the door, and the opening/closing switch is turned off when the door is closed and is turned on when the door is opened.

Therefore, since the switch knob 30M is connected to the courtesy line C if the knob 30M is on the DOOR side even though the switch knob 30L of the bulb B1 is on the OFF side or the switch knob 30R of the bulb B2 is on the OFF side, the door opening/closing switch is turned off and the bulbs B1 and B2 are extinguished if the door is closed. However, the door opening/closing switch is turned on and the bulbs B1 and B2 are lighted if the door is opened.

3-2) If the switch knob 30M is on the ON side, the bulb in which the contact point is the OFF side and which is extinguished is lighted regardless of the opening and closing of the door.

3-3) If the switch knob 30M is the OFF side, the bulb in which the contact point is the OFF side is extinguished regardless of the opening and closing of the door.

<First Embodiment: Gate is Formed on Side Surface of Switch Knob Inserting Opening of Lens>

Figure 8A:
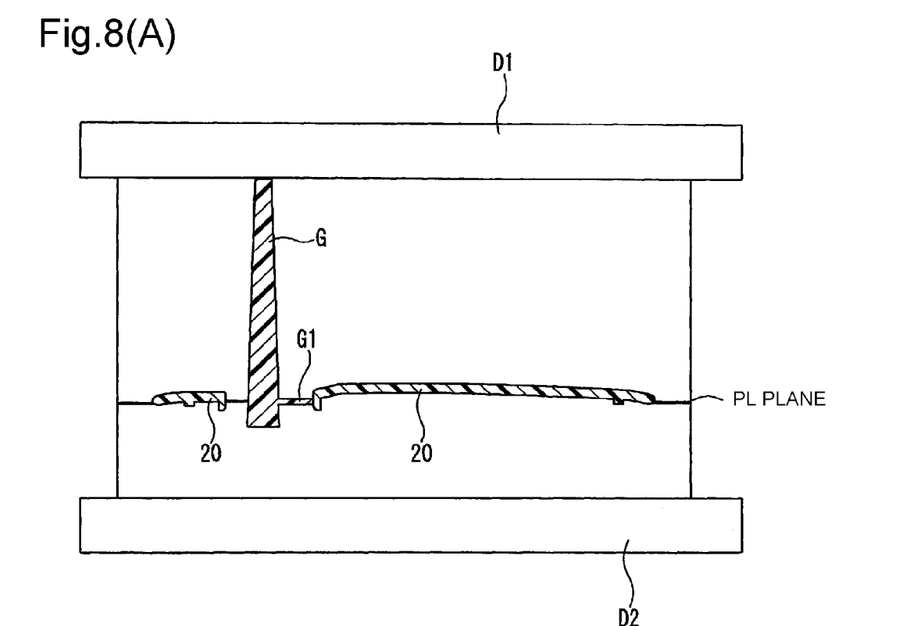
FIG. 8(A) is a cross-sectional view of a mold explaining the position of the gate according to the present invention.
Figure 8B:
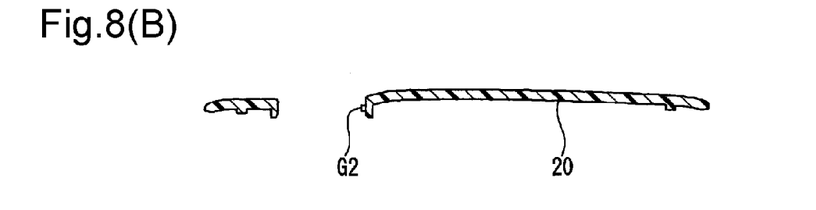
FIG. 8(B) is a cross-sectional view through a gate trace of a lens molded by a mold of FIG. 8(A)

FIG. 8(A) is a cross-sectional view of a mold explaining the position of the gate according to the present invention, and FIG. 8(B) is a cross-sectional view of the lens molded by a mold of FIG. 8(A).

In FIGS. 8(A) and 8(B), the mold is constituted by an upper mold D1 and a lower mold D2, and a cavity having the shape of the lens 20 is formed on a PL plane. A main gate (injection passage) G which perpendicularly penetrates from the outside toward the PL plane is formed in the upper mold D1, and a branch gate G1 which penetrates from the main gate G to the lens 20 in the PL plane is formed.

Figure 9:
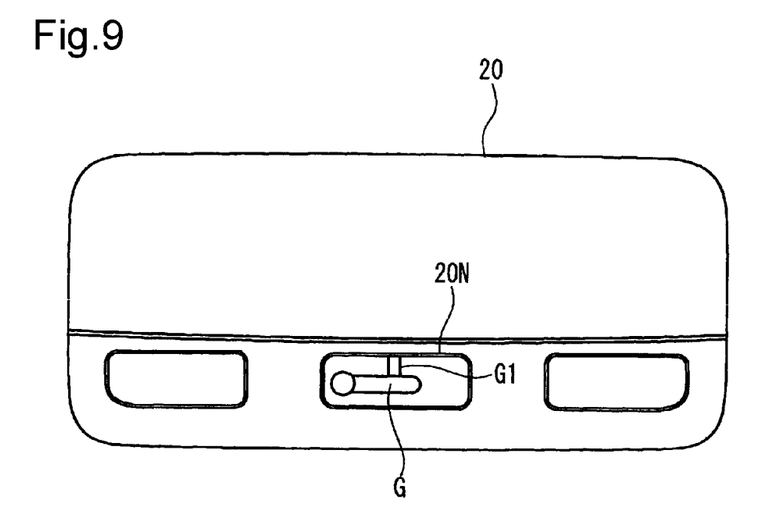
FIG. 9 is a plan view showing the lens before the gate is cut, and the lens is molded by the mold according to the present invention.

In this way, the gates G and G1 are formed at the side surfaces of the inserting openings 20N (FIG. 2) of the lens 20 which insert the switch knobs 30 (FIG. 2), and the lens 20 which is solidified in a state where the lens 20 and the gates G1 and G are integrated is obtained as shown in FIG. 9 if molten resin is injected into the cavities of the mold via the gates G and G1 from the outside.

Thereafter, if the gate G1 of FIG. 9 is cut at the base of the inserting opening 20N, the lens 20 is obtained.

<Advantage of First Embodiment>

In the lens 20 obtained in this way, a gate trace G2 (FIG. 8(B)) which is difficult to avoid even after the gate is cut is inevitably generated. However, since it is difficult to see the gate trace G2 from the surface of the lens 20, the lens 20 having an improved appearance can be obtained.

<Second Embodiment: Protrusions Having Bulk Higher Than That of Gate>Trace are Formed at Side Surface of Switch Knob Inserting Opening In this way, since occurrence of the gate trace G2 in the lens 20 is unavoidable, in a second embodiment, protrusions having bulk higher than the height of the gate trace G2 are formed in the vicinity of the gate trace G2, and the lens 20 having a protrusion 20T shown in FIG. 8(C) can be obtained at the side surface of the switch knob inserting opening of the lens 20.

Figure 8C:
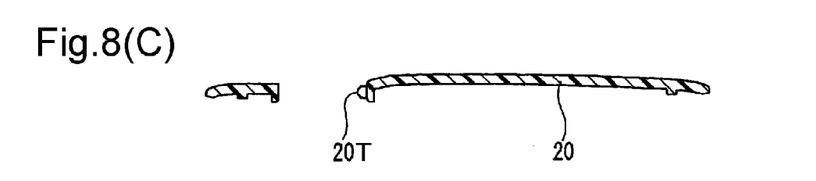
FIG. 8(C) is a cross-sectional view through a protrusion of the lens molded by the mold of FIG. 8(A).

In addition, the gate trace G2 of FIG. 8(B) and the protrusion 20T of FIG. 8(C) are emphatically drawn so that both heights are identified, and actually, both heights are low enough to be difficult to distinguish with the naked eye.

Figure 10:
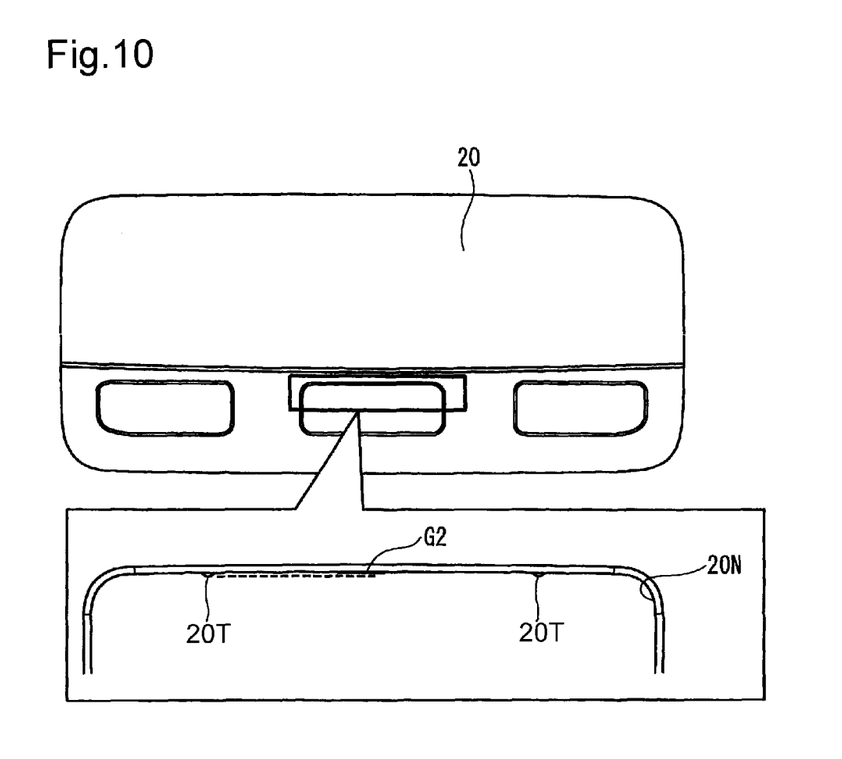
FIG. 10 is a plan view showing the lens after the gate is cut, and the lens is molded by the mold according to the present invention.
Figure 11:
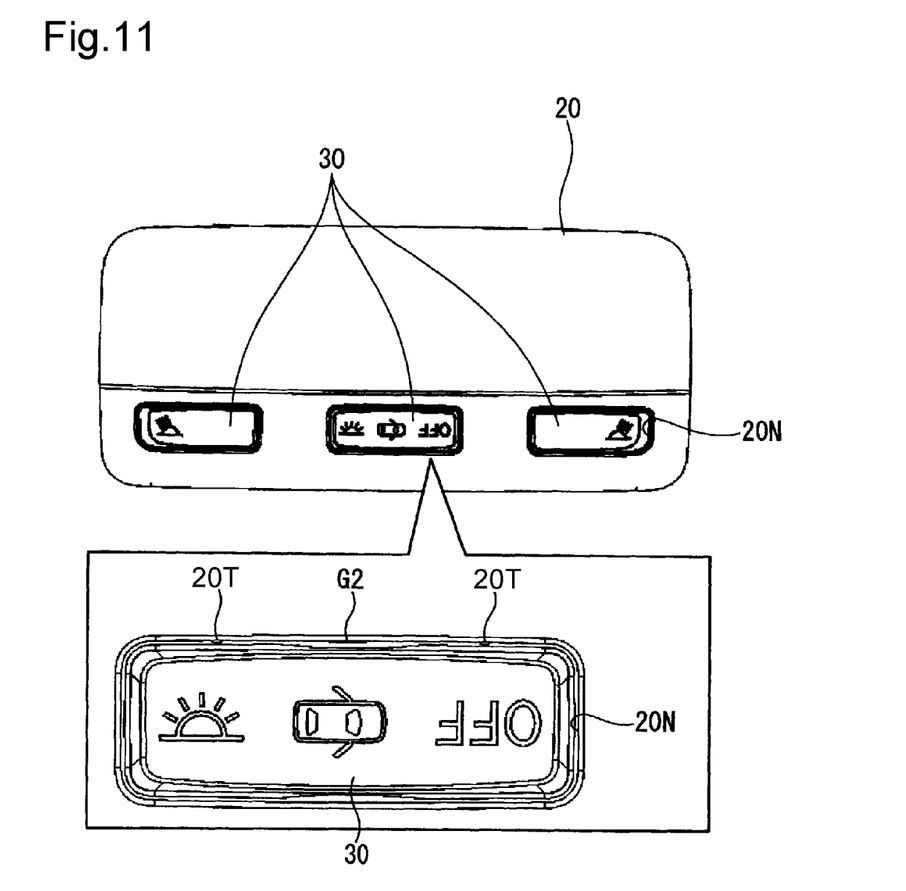
FIG. 11 is a plan view of the lens in which switch knobs are mounted on an inserting opening of a lens after the gate is cut, and the lens is molded by the mold according to the present invention.

The lens 20 of the second embodiment in which the gates G1 of FIG. 9 are cut at the base of the inserting openings 20N is like FIG. 10. The plurality of protrusions 20T according to the present invention is formed at the inner side surfaces of the inserting openings 20 which insert the switch knobs 30, and the gate trace G2 is generated. If the switch knobs 30 are inserted into the inserting openings 20N, as shown in FIG. 11, even though the switch knobs 30 perform a seesaw movement, the switch knobs 30 contact only the molded protrusions 20T. Therefore, the switch knobs 30 do not contact the gate trace G2 and scratches in the switch knobs do not occur.

<Pin Gate Molding>

In the present invention, the gates are provided at the switch knob inserting openings 20N. However, two places having a possibility in which the gates can be installed at a place other than the switch knob inserting openings 20N are considered.

Here, the reason why the two places are not suitable will be described below.

Figure 12:
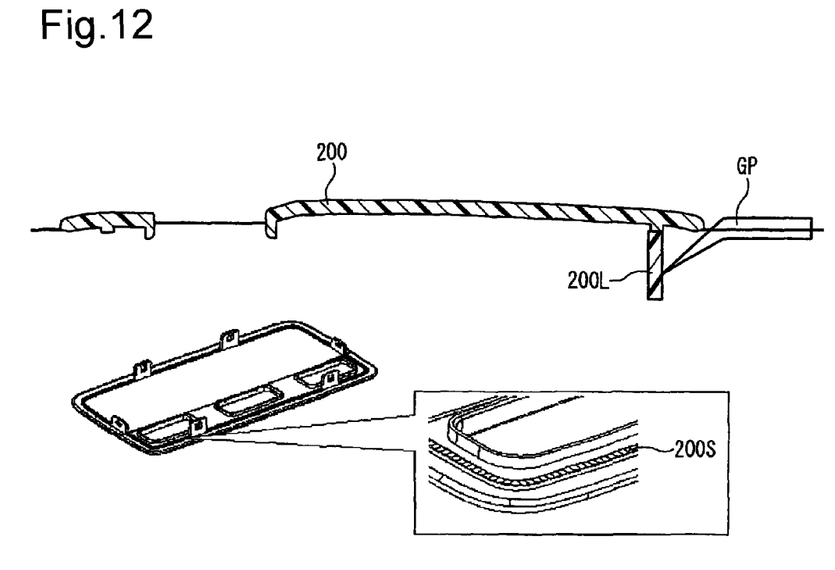
FIG. 12 is a longitudinal cross-sectional view explaining a mold portion of the lens which is molded by a pin gate.

As the installation of the gates in the other places which are considered, a rib 200L is formed at the rear surface of the lens 200 as shown in FIG. 12, and molten resin flows into the rib through a pin gate GP.

<Disadvantage of Pin Gate Molding>

Since serrations 200S (FIG. 12) cannot be provided to the rib 200L, there is a disadvantage in that appearance of the lens is not favorable, and the installation of the pin gate is inferior compared to the installation of the gate of the present invention.

<Side Gate Molding>

Figure 13:
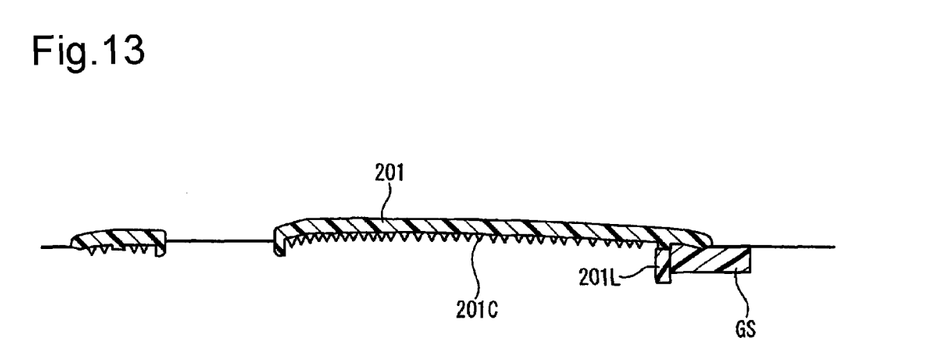
FIG. 13 is a longitudinal cross-sectional view explaining a mold portion of the lens which is molded by a side gate.

A rib 201L is formed at the rear surface of the lens 201 as shown in FIG. 13, and molten resin flows into the rib through a side gate GS.

<Disadvantage of Side Gate Molding>

Since lens cuts 201C cannot be provided to the gate portion, there is a disadvantage in that appearance of the lens surface is not favorable, and the installation of the side gate is inferior compared to the installation of the gate of the present invention.

According to the present invention, since it is difficult to see the gate trace from the surface of the lens even though the gate trace is generated, a lens having an improved appearance can be obtained. In addition, since protrusions having a bulk higher than the height of the gate trace are formed in the vicinity of the gate trace, scratches on the switch knobs are not generated even though the gate trace is generated.

What is claimed is:

1. A resin molded lens of an interior illumination lamp, the resin molded lens including an inserting opening inserting a seesaw type switch knob,
    wherein the resin molded lens is formed by installing a gate for resin molding at an inner side surface of the inserting opening when the resin molding is performed.

2. The resin molded lens according to claim 1, wherein a protrusion having a height higher than a height of a gate trace generated by the gate is formed in the vicinity of the gate trace.

* * * * *